March 6, 1951  M. PONTE  2,544,104
ELECTRIC DISCHARGE VALVE
Filed Nov. 27, 1946
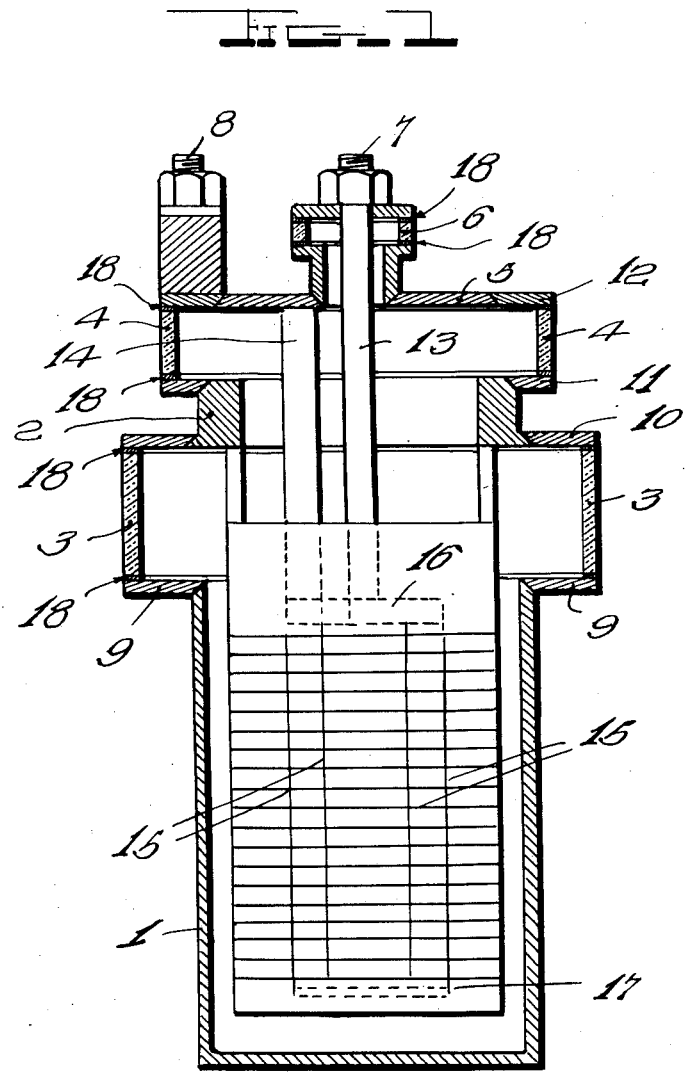
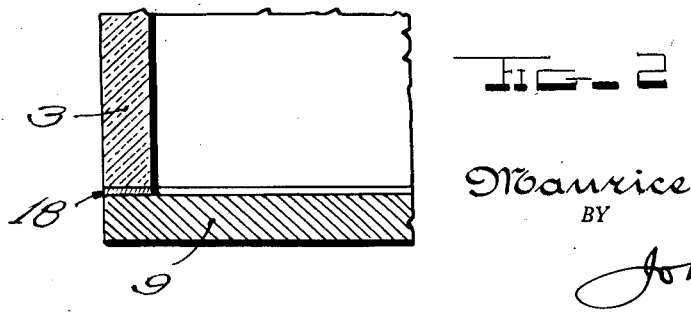
INVENTOR.
Maurice Ponte,
BY
John B. Brady
ATTORNEY Patented Mar. 6, 1951

2,544,104

UNITED STATES PATENT OFFICE 2,544,104

ELECTRIC DISCHARGE VALVE

Maurice Ponte, Paris, France, assignor to Societe Francaise Radio Electrique, a corporation of France Application November 27, 1946, Serial No. 712,475
In France April 1, 1941

Section 1, Public Law 690, August 8, 1946
Patent expires April 1, 1961

6 Claims. (Cl. 250—27.5)

This invention relates to electric discharge valves.

Up to the present time, the great majority of discharge valves used for the emission of electric waves have been sealed evacuated valves and in their construction importance has been attached more particularly to the electric qualities of the valves. Improvements in such valves have been directed to a better arrangement of the component parts from this point of view.

Technical work on valves called "emission valves" has thus permitted of attaining units of high unitary power such as three or four hundred actual kilowatts in telegraphic operation. Sealed valves constructed in accordance with this technical principle have the advantage of tubes completely evacuated and treated at the works; their use is simple, they require no special installations and users of the valves have no necessity to consult other technical principles than the current ones of transmission stations.

Such sealed valves, however, possess drawbacks due to the fact that they are units of high price which remain fragile in spite of every precaution that may be taken to prevent breakage. On the other hand constructions of such valves heretofore proposed have only allowed the re-use of their constructional materials with great difficulty when the valve has met with an accident or when it has become useless at the end of a normal life.

It has been sought to remedy these drawbacks by the use of valves, known as "demountable valves," in which the vacuum is maintained permanently at the station. These demountable valves possess the advantage of permitting the re-use of the components of the valve in an almost indefinite manner, except as regards the cathode and various minor accessories. They, nevertheless, have drawbacks, the principal of which is the necessity of providing pumping facilities at the station for exhausting the valves in use and also for exhausting the renewal valves. The renewal valves evolve considerable capital and necessitate extensive maintenance. The station staff accordingly has to include expert operators for this work. Altogether, the hourly cost of demountable valves is as high as, if not higher than, that of sealed valves, and an economic result is not attained. Moreover, the pumping groups are often inefficiently utilized and represent a very substantial investment in equipment since one of them could be utilized in a station for the pumping of numerous sealed valves. Finally, the use of demountable valves necessitates heterogeneous equipments formed of sealed valves for some stages and demountable valves for others.

The improvements according to the present invention combine the advantage of the sealed valves and those of the demountable valves by eliminating the drawbacks referred to. It takes advantage of methods already known for the direct attachment of metals to insulating materials by processes which permit a very localized heating of the points of attachment, leading to the novel industrial result of a sealed valve easily demountable or dismemberable as regards its constructional parts without damage thereto. A valve out of use can thus be returned to the repair shop, where it is opened by a process of the kind referred to and the deteriorated or damaged component replaced. The valve is then re-sealed, re-evacuated and returned to the station. In this way, the station can operate according to current technical practice with a stock of renewal valves sufficient to ensure working during the period of repairs. The economic result is attained since the hourly cost price is obviously reduced as compared with that of the sealed valves hitherto known; and as compared also with that of the demountable valves, the materials are largely economized and the user is relieved of the necessity of pumping out the valves, which operation is a highly specialized one.

The main object of this invention is to provide a sealed electric discharge valve comprising metallic members supporting different electrodes of the valve and connected to one another through the intermediary of insulating members to which they are welded, said metallic members having such a form that the welding of a joint by a process of localized high frequency heating can be performed without transmission of sufficient heat to a neighboring joint to interfere with the existing welding thereof.

The invention will now be further described with reference to the accompanying drawing, which shows one preferred embodiment by way of example, as applied to a triode, with a filament having two poles. Obviously, the general construction could be extended to apply to a multi-grid tube, a polyphased filament or any other similar form of discharge valve.

In the drawings—

Figure 1 is a vertical sectional view taken through a removable discharge tube embodying my invention; and Fig. 2 is an enlarged fragmentary sectional view illustrating the manner of removably connecting the insulation and electrically conductive parts of the envelope of the discharge tube.

Referring to the drawings, an anode 1 is connected to a grid 2 by an insulating member 3.

The grid 2 is connected to a cathode 5 by an insulator 4.

According to the invention, the joints of these parts are made by welding at high frequency the edges of flat or plane parts 9, 10, 11, 12 formed on the metallic components in a metal welding well.

By way of example, the metallic components, at least at the parts thereof whereat the welds are made, may be composed of an iron nickel-cobalt alloy and the insulating members may be composed of a silico-borated glass, the coefficient of expansion of which closely approximates that of the alloy used to form the metallic component.

The joints of the parts are located at the edges of the electrically conductive flat parts 9, 10, 11, 12 of the metallic components, as represented for example in Fig. 2 at 18 with the result that the necessary heating by high frequency current for the purposes of a welding or unwelding operation is prevented from raising the temperature at an adjacent joint sufficiently to result in an unwelding thereof. It is advisable in this connection to select a metal for the metallic components, or at least for the parts thereof carrying the joints, having a low thermal conductivity. If this should present any difficulty, for example, by reason of its tending to interfere with efficient operation of the valve at high frequency, the surfaces of the metallic components to be welded, may be coppered or gilded, using for this operation any of the customary methods in the art.

The insulating members may be of any other necessary or convenient form than that shown in the drawing and their component material may be any other suitable material than glass. They may in particular be of accordion form and their component material may be a ceramic, in which case welding by enamels, using known processes, may be employed.

The connections in the valve are made in accordance with standard practice.

As shown, the valve is so designed that its principal components (anode, cathode and grid) are all separate units which are individually removable from place in the valve or placeable or replaceable therein without disturbance of any of the rest of the components. Thus, the cathode 5 forms such a unit; one of the poles of the filament terminates on this unit, whilst the other pole is insulated from the cathode by an insulating member 6, the joints of which, with the part carrying it and to the cathode, are made in the same way as those of the joints of the insulating members 3, 4 to the electrically conductive parts 9, 10, 11, 12; and current conductors 13, 14 associated with terminals 7, 8 conduct the current to filament loops 15, 17 by parts 16, the constructional details of which are not shown.

The advantage of the construction of my invention will be made clear by explaining the method of operation to be followed in the most frequent case where a valve will be returned with a burnt filament. In this case, by means of a high frequency furnace with localized field such as those which are known in the art, the margin of the part 12 on the cathode 5 will be raised to about 900° C. The joint at the edge of said margin can then be broken. The cathode 5 is then removed, the metal of the joint is cleaned and the damaged piece is repaired, for example by disconnecting the parts 16 hereinbefore referred to. According to the insulation employed, it may be necessary to completely replace the insulating member 4 by a fresh member. In that event, the joint at the edge of the part 11 will also be unwelded by high frequency heating and disconnected and the metal of the joint will be cleaned. In fitting up again, the reverse operations will be followed.

The procedure is the same for the repair of other components of the valve.

It will be noted that according to the invention a valve is provided which while being really a sealed valve, has the advantages of a demountable valve since the method of localized heating employed in the welding of the valve joint enables the dimensions of the insulating members and thus also those of the passages, to be reduced, which, as is known, is advantageous in the case of very short waves. At the same time, the usual necessity in demountable valves of cooling the joints of the valve is avoided with a valve in accordance with this invention.

The invention is applicable to rectifiers, oscillographs and vacuum discharge valves in general.

While I have described my invention in one of its preferred embodiments I realize that changes in detail may be made and I desire that it be understood that no limitations upon my invention are intended other than are imposed by the scope of the appended claims.

What I claim is:

1. A demountable sealed vacuum tube having a permanent vacuum, comprising a vacuum-tight envelope, a plurality of electrodes enclosed thereby each supported by a metallic sleeve forming part of the vacuum-tight envelope, the longitudinal section of said sleeves being substantially in the shape of a U having its sides turned toward the exterior of the tube, the said metallic sleeves alternating with cylindrical sleeves of insulating material placed between the external flanges of the U-shaped sides of two successive sleeves to which they are connected along their peripheral edges, the groups of said sleeves being mounted concentrically and in stepped arrangement.

2. A demountable sealed vacuum tube as set forth in claim 1, wherein the sleeves have substantially different diameters.

3. A demountable sealed vacuum tube having a permanent vacuum, comprising a vacuum-tight envelope, a plurality of electrodes each supported by a metallic sleeve extending axially forming part of said vacuum-tight envelope, the said metallic sleeves alternating with sleeves of insulating material to which they are connected along their external peripheral edges, the said metallic sleeves having substantially different diameters.

4. A demountable discharge tube having a hermetically sealed envelope comprising a plurality of electrodes, a plurality of electrically conductive supports equal in number to that of the said electrodes, means individually connecting each of the respective electrodes to an adjacent conductive support, insulating parts disposed at different radial distances from the axis of the tube and disposed between said supports and secured thereto at their external peripheral edges, said parts and said supports forming part of the outer wall of the hermetic envelope of said tube.

5. A demountable sealed vacuum tube having a permanent vacuum comprising a cylindrical anode terminating in an annular flange, a cylindrical sleeve of insulation material connected with the periphery of said flange, a metallic sleeve having an internal diameter less than the internal diameter of said cylindrical anode and terminating in spaced annular flanges at the opposite ends thereof, one of said flanges of said metallic sleeve being connected at its periphery with said cylindrical sleeve of insulation material, a separate sleeve of insulation material connected at its periphery with the other annular flange of said metallic sleeve, another metallic sleeve terminating in spaced annular flanges, said last mentioned metallic sleeve having an internal diameter less than the internal diameter of the aforementioned metallic sleeve and having one of the annular flanges thereof connected with the periphery of said second sleeve of insulation material, a further sleeve of insulation material connected with the periphery of the other flange of said last mentioned metallic sleeve, a conductive plate member supported by said last mentioned sleeve of insulation material in insulated relation to said second mentioned metallic sleeve, a grid electrode spacially related to said cylindrical anode and supported by said second mentioned metallic sleeve, and a cathode supported by said second mentioned metallic sleeve and by said conductive plate member and spacially related to said grid electrode and said anode.

6. In a demountable electron discharge tube a vacuum-tight envelope, a plurality of electrodes, a plurality of electrically conductive sleeves of a flange-shape, means connecting each of said electrodes to an adjacent conductive sleeve, insulating sleeves disposed on different levels and projecting to different radial distances with respect to each other and to the axis of the tube and concentrically to the axis of the tube and disposed between adjacent conductive flange-shaped sleeves and sealed thereto at their bases for forming hermetic joints, said sleeves and said conductive flange-shaped sleeves forming parts of the outer wall of the envelope of said tube.

MAURICE PONTE.

REFERENCES CITED

The following references are of record in the file of this patent:

UNITED STATES PATENTS

| Number | Name | Date |
|---|---|---|
| 1,197,615 | Eldred | Sept. 12, 1916 |
| 1,632,870 | Bartlett et al. | June 21, 1927 |
| 1,716,931 | Prindle | June 11, 1929 |
| 1,874,355 | Round | Aug. 30, 1932 |
| 2,089,541 | Dallenbach | Aug. 10, 1937 |
| 2,107,945 | Hull et al. | Feb. 8, 1938 |
| 2,121,600 | Knowles et al. | June 21, 1938 |
| 2,140,707 | Lee | Dec. 20, 1938 |
| 2,219,573 | Fraenckel | Oct. 29, 1940 |
| 2,297,492 | Michaelis | Sept. 29, 1942 |
| 2,303,166 | Laico | Nov. 24, 1942 |

FOREIGN PATENTS

| Number | Country | Date |
|---|---|---|
| 27,193 of 1930 | Australia | June 12, 1930 |
| 514,967 | Great Britain | Nov. 22, 1939 |
| 853,441 | France | Dec. 7, 1939 |